United States Patent
Muthu et al.

(10) Patent No.: US 9,721,255 B2
(45) Date of Patent: Aug. 1, 2017

(54) DISTRIBUTING COUPON CONTENT AND TRANSACTIONAL ADVERTISEMENTS

(75) Inventors: Manickababu Muthu, Fremont, CA (US); Gayathri Uday Nayak, Cupertino, CA (US); Nahrin Reihaneh, San Jose, CA (US); Tino Gudelj, Zurich (CH); Ravi Kant Keswani, Fremont, CA (US); Steven R. Boal, Los Altos, CA (US)

(73) Assignee: QUOTIENT TECHNOLOGY INC., Mountain View, CA (US)

( * ) Notice: Subject to any disclaimer, the term of this patent is extended or adjusted under 35 U.S.C. 154(b) by 1334 days.

(21) Appl. No.: 13/043,238

(22) Filed: Mar. 8, 2011

(65) Prior Publication Data
US 2011/0153410 A1 Jun. 23, 2011

Related U.S. Application Data

(63) Continuation of application No. 12/465,634, filed on May 13, 2009, now abandoned.

(60) Provisional application No. 61/052,996, filed on May 13, 2008.

(51) Int. Cl.
*G06Q 30/00* (2012.01)
*G06Q 30/02* (2012.01)

(52) U.S. Cl.
CPC ......... *G06Q 30/00* (2013.01); *G06Q 30/0225* (2013.01); *G06Q 30/0238* (2013.01); *G06Q 30/0239* (2013.01); *G06Q 30/0277* (2013.01)

(58) Field of Classification Search
USPC .................................................. 705/14.39
See application file for complete search history.

(56) References Cited

U.S. PATENT DOCUMENTS

| | | | |
|---|---|---|---|
| 4,723,212 A | 2/1988 | Mindrum et al. |
| 4,745,468 A | 5/1988 | Von Kohrn |
| 4,791,281 A | 12/1988 | Johnsen et al. |
| 4,876,592 A | 10/1989 | Von Kohrn |
| 4,882,675 A | 11/1989 | Nichtberger et al. |
| 4,896,791 A | 1/1990 | Smith |
| 4,910,672 A | 3/1990 | Off et al. |
| 4,926,255 A | 5/1990 | Von Kohrn |

(Continued)

FOREIGN PATENT DOCUMENTS

AU 2006/294868 6/2011
EP 0 512 509 B1 11/1992

(Continued)

OTHER PUBLICATIONS

Microsoft Windows XP version 2002 screen shot showing controls disabled by admin.*

(Continued)

*Primary Examiner* — Daniel Sorkowitz
(74) *Attorney, Agent, or Firm* — Hickman Palermo Becker Bingham LLP (57) ABSTRACT

A system, method, and computer-readable storage medium having processor-executable instructions recorded thereon is provided for distributing transactional advertisements from a distribution site over a network to online publishers. Transactional data items are rendered by the online publishers, with control elements provided from the distribution site, to control use of the transactional data items on the user terminal.

15 Claims, 5 Drawing Sheets

(56) References Cited

U.S. PATENT DOCUMENTS

| | | |
|---|---|---|
| 4,949,256 A | 8/1990 | Humble |
| 5,034,807 A | 7/1991 | Von Kohrn |
| 5,056,019 A | 10/1991 | Schultz et al. |
| 5,057,915 A | 10/1991 | Von Kohrn |
| 5,085,470 A | 2/1992 | Peach et al. |
| 5,119,294 A | 6/1992 | Tanaka |
| 5,128,520 A | 7/1992 | Rando et al. |
| 5,128,752 A | 7/1992 | Von Kohrn |
| 5,185,695 A | 2/1993 | Pruchnicki |
| 5,192,854 A | 3/1993 | Counts |
| 5,227,874 A | 7/1993 | Von Kohrn |
| 5,245,533 A | 9/1993 | Marshall |
| 5,249,044 A | 9/1993 | Von Kohrn |
| 5,283,731 A | 2/1994 | Lalonde |
| 5,283,734 A | 2/1994 | Von Kohrn |
| 5,285,278 A | 2/1994 | Holman |
| 5,287,181 A | 2/1994 | Holman |
| 5,305,195 A | 4/1994 | Murphy |
| 5,305,197 A | 4/1994 | Axler et al. |
| 5,321,604 A | 6/1994 | Peach et al. |
| 5,353,218 A | 10/1994 | De Lapa et al. |
| 5,361,871 A | 11/1994 | Gupta |
| 5,368,129 A | 11/1994 | Von Kohrn |
| 5,380,991 A | 1/1995 | Valencia et al. |
| 5,401,946 A | 3/1995 | Weinblatt |
| 5,420,606 A | 5/1995 | Begum |
| 5,459,306 A | 10/1995 | Stein et al. |
| 5,483,049 A | 1/1996 | Schulze, Jr. |
| 5,488,423 A | 1/1996 | Walkingshaw et al. |
| 5,500,681 A | 3/1996 | Jones |
| 5,502,636 A | 3/1996 | Clarke |
| 5,504,519 A | 4/1996 | Remillard |
| 5,508,731 A | 4/1996 | Kohrn |
| 5,509,070 A | 4/1996 | Schull |
| 5,528,490 A | 6/1996 | Hill |
| 5,557,721 A | 9/1996 | Fite et al. |
| 5,594,910 A | 1/1997 | Filepp |
| 5,604,542 A | 2/1997 | Dedrick |
| 5,612,527 A | 3/1997 | Ovadia |
| 5,636,346 A | 6/1997 | Saxe |
| 5,642,485 A | 6/1997 | Deaton |
| 5,687,322 A | 11/1997 | Deaton et al. |
| 5,697,844 A | 12/1997 | Von Kohrn |
| 5,708,782 A | 1/1998 | Larson et al. |
| 5,710,884 A | 1/1998 | Dedrick |
| 5,710,886 A | 1/1998 | Christensen et al. |
| 5,713,795 A | 2/1998 | Von Kohrn |
| 5,715,314 A | 2/1998 | Payne |
| 5,724,521 A | 3/1998 | Dedrick |
| 5,759,101 A | 6/1998 | Von Kohrn |
| 5,761,648 A | 6/1998 | Golden et al. |
| 5,761,683 A | 6/1998 | Logan et al. |
| 5,774,869 A | 6/1998 | Toader |
| 5,791,991 A | 8/1998 | Small |
| 5,794,210 A | 8/1998 | Goldhaber et al. |
| 5,821,512 A | 10/1998 | O'Hagan et al. |
| 5,822,735 A | 10/1998 | De Lapa et al. |
| 5,845,302 A | 12/1998 | Cyman, Jr. |
| 5,848,396 A | 12/1998 | Gerace |
| 5,855,007 A | 12/1998 | Jovicic |
| 5,884,033 A | 3/1999 | Duvall |
| 5,903,874 A | 5/1999 | Leonard et al. |
| 5,907,830 A | 5/1999 | Engel et al. |
| 5,916,024 A | 6/1999 | Von Kohrn |
| 5,918,211 A | 6/1999 | Sloane |
| 5,918,213 A | 6/1999 | Bernard et al. |
| 5,969,678 A | 10/1999 | Stewart |
| 5,970,469 A | 10/1999 | Scroggie et al. |
| 5,979,757 A | 11/1999 | Tracy et al. |
| 6,002,771 A | 12/1999 | Nielsen |
| 6,006,269 A | 12/1999 | Phaal |
| 6,009,411 A | 12/1999 | Kepecs |
| 6,014,634 A | 1/2000 | Scroggie et al. |
| 6,018,748 A | 1/2000 | Smith |
| 6,035,280 A | 3/2000 | Christensen |
| 6,047,310 A | 4/2000 | Kamakura et al. |
| 6,055,510 A | 4/2000 | Henrick et al. |
| 6,055,513 A | 4/2000 | Katz et al. |
| 6,067,526 A | 5/2000 | Powell |
| 6,076,069 A | 6/2000 | Laor |
| 6,123,259 A | 9/2000 | Ogasawara |
| 6,129,276 A | 10/2000 | Jelen et al. |
| 6,134,532 A | 10/2000 | Lazarus et al. |
| 6,175,823 B1 | 1/2001 | Van Dusen |
| 6,185,541 B1 | 2/2001 | Scroggie |
| 6,278,979 B1 | 8/2001 | Williams |
| 6,292,786 B1 | 9/2001 | Deaton et al. |
| 6,298,329 B1 | 10/2001 | Walker et al. |
| 6,298,446 B1 | 10/2001 | Schreiber et al. |
| 6,321,208 B1 | 11/2001 | Barnett |
| 6,332,127 B1 | 12/2001 | Bandera et al. |
| 6,336,099 B1 | 1/2002 | Barnett et al. |
| 6,360,254 B1 | 3/2002 | Linden et al. |
| 6,377,935 B1 | 4/2002 | Deaton et al. |
| 6,377,986 B1 | 4/2002 | Philyaw et al. |
| 6,385,591 B1 | 5/2002 | Mankoff |
| 6,408,286 B1 | 6/2002 | Heiden |
| 6,434,530 B1 | 8/2002 | Sloane et al. |
| 6,484,939 B1 | 11/2002 | Blaeuer |
| 6,615,179 B1 | 9/2003 | McNicol et al. |
| 6,638,316 B1 | 10/2003 | Tyler et al. |
| 6,687,346 B1 | 2/2004 | Swartz et al. |
| 6,915,271 B1 | 7/2005 | Meyer et al. |
| 7,032,030 B1 | 4/2006 | Codignotto |
| 7,089,195 B2 | 8/2006 | Rosenberg |
| 7,231,357 B1 | 6/2007 | Shanman et al. |
| 7,640,240 B2 | 12/2009 | Boal et al. |
| 7,734,621 B2 | 6/2010 | Weitzman et al. |
| 7,784,702 B2 | 8/2010 | Michels |
| 7,933,984 B1 | 4/2011 | Smith et al. |
| 7,962,931 B2 | 6/2011 | Bova |
| 8,000,496 B2 | 8/2011 | Keswanie et al. |
| 8,055,642 B2 | 11/2011 | Boal et al. |
| 8,165,078 B2 | 4/2012 | Walsh et al. |
| 2001/0001145 A1 | 5/2001 | Barnett |
| 2001/0014868 A1 | 8/2001 | Herz et al. |
| 2001/0047297 A1 | 11/2001 | Wen |
| 2002/0138345 A1 | 9/2002 | Dickson et al. |
| 2002/0178051 A1 | 11/2002 | Golden et al. |
| 2002/0184088 A1 | 12/2002 | Rosenberg |
| 2002/0194069 A1 | 12/2002 | Thakur et al. |
| 2003/0083931 A1 | 5/2003 | Lang |
| 2003/0093314 A1 | 5/2003 | Leung |
| 2003/0097593 A1 | 5/2003 | Sawa et al. |
| 2003/0117635 A1 | 6/2003 | Roberts |
| 2004/0030598 A1 | 2/2004 | Boal |
| 2004/0039704 A1* | 2/2004 | Gilliam et al. .............. 705/50 |
| 2004/0088218 A1 | 5/2004 | Abraham |
| 2004/0098304 A1 | 5/2004 | Truong et al. |
| 2004/0141611 A1 | 7/2004 | Szrek et al. |
| 2004/0143502 A1 | 7/2004 | McClung |
| 2004/0193487 A1 | 9/2004 | Purcell et al. |
| 2004/0230476 A1 | 11/2004 | Messer |
| 2004/0230485 A1 | 11/2004 | Barnett et al. |
| 2004/0236702 A1 | 11/2004 | Fink |
| 2005/0149404 A1 | 7/2005 | Barnett et al. |
| 2005/0149613 A1 | 7/2005 | Amjadi |
| 2005/0239448 A1 | 10/2005 | Bayne |
| 2005/0262005 A1 | 11/2005 | Woolston |
| 2006/0015401 A1 | 1/2006 | Chu et al. |
| 2006/0026013 A1 | 2/2006 | Kraft |
| 2006/0026067 A1 | 2/2006 | Nicholas et al. |
| 2006/0031314 A1 | 2/2006 | Brahms et al. |
| 2006/0122883 A1 | 6/2006 | Lynn |
| 2006/0136294 A1 | 6/2006 | Linden et al. |
| 2006/0143307 A1 | 6/2006 | Codignotto |
| 2006/0143477 A1 | 6/2006 | Stevens |
| 2006/0212350 A1 | 9/2006 | Ellis et al. |
| 2006/0224457 A1 | 10/2006 | Rosenberg |
| 2007/0033106 A1 | 2/2007 | Mason |
| 2007/0073579 A1 | 3/2007 | Immorlica et al. |
| 2007/0156528 A1* | 7/2007 | Hopp et al. .............. 705/14 |
| 2007/0244745 A1 | 10/2007 | Boal |
| 2007/0255821 A1 | 11/2007 | Ge |

(56) References Cited

U.S. PATENT DOCUMENTS

| | | | |
|---|---|---|---|
| 2007/0288313 | A1* | 12/2007 | Brodson et al. ............... 705/14 |
| 2007/0293200 | A1 | 12/2007 | Roundtree et al. |
| 2008/0097837 | A1 | 4/2008 | Jacobson |
| 2008/0162200 | A1 | 7/2008 | O'Sullivan et al. |
| 2008/0163128 | A1 | 7/2008 | Callanan et al. |
| 2008/0177603 | A1 | 7/2008 | Muthogopalakrishnan et al. |
| 2008/0183576 | A1 | 7/2008 | Kim et al. |
| 2008/0208688 | A1 | 8/2008 | Byerley et al. |
| 2008/0215438 | A1 | 9/2008 | Muthogopalakrishnan et al. |
| 2008/0221980 | A1 | 9/2008 | Greeson et al. |
| 2008/0267500 | A1 | 10/2008 | Keswani et al. |
| 2009/0030794 | A1 | 1/2009 | Scheflan et al. |
| 2009/0240582 | A1 | 9/2009 | Sheldon-Neal et al. |
| 2010/0042490 | A1 | 2/2010 | Boal |
| 2010/0057549 | A1 | 3/2010 | Boal |
| 2010/0124235 | A1 | 5/2010 | Walsh et al. |
| 2010/0205059 | A1 | 8/2010 | Yehoshua et al. |

FOREIGN PATENT DOCUMENTS

| | | |
|---|---|---|
| JP | 2002/298052 A | 10/2002 |
| WO | WO 95/01060 | 1/1995 |
| WO | WO 01/16853 A1 | 3/2001 |
| WO | WO 02095535 A2 | 11/2002 |
| WO | WO 2007/048063 A2 | 4/2007 |

OTHER PUBLICATIONS

"Acu-Trac and Cox Launch Interactive Couponing Service," Electronic Marketplace Report, IAC Newsletter Database, Information Access Company, Mar. 21, 1995, 2 pages.
Anderson, "CoolSavings.com Settles Patent-Infringement Suit," The Industry Standard Magazine, Jan. 13, 2000, 2 pages. http://archives.cnn.com/2000/TECH/computing/04/03/coupon.patent.idg/index.html.
Anderson, "Online-coupon companies battle over patents," CNN.com—Technology, Apr. 3, 2000, 4 pages. http://web.archive.org/web/20010712032039/www.thestandard.com/article/0,1902,8853,00.html.
Canadian Patent Office "Office Action" Applciation. No. 2,644,904 dated Aug. 3, 2010 (2 pages).
Current Claims of Canadian Application No. 2,644,904 (7 pages).
Douglass, "Cruising for Food Savings on Internet," The San Diego Union-Tribune, Apr. 20, 1996, Section: Business, p. C1, 2 pages.
"Emaginet plans to 'push' its way into consumer mindest, pocketbook," Interactive Marketing News, vol. 4, No. 22, May 30, 1997, 2 pages.
European Office Action received in Application No. 08705982.0 dated Dec. 29, 2010 (4 pages).
Current Claims of European Application No. 08705982.0 (5 pages).
Freitag, "In this Computer Age, Who Needs Coupons?," The New York Times, Jun. 15, 1989—p. A1 (2 pages).
Graham, I., "The HTML Sourcebook, $2^{nd}$ edition, A Complete Guide to HTML 3.0", Wiley Publishing Company, 1996, pp. 233-234.
ImageSafe, "ImageSaft-Image copy protection," undated, 3 pages. http://www.cellspark.com/imagesafe.html.
Spethmann, "Coupons Shed Low-Tech Image," Brandweek, Oct. 24, 1994, pp. 30-31. http://login.vnuemedia.com/bw/esearch/article_display.jsp?vnu_content_id=546705.
Sutherland, "Promotion Profile," Marketing & Media Decisions, vol. 24, No. 10, Oct. 1989, pp. 103(1).
Tanner, "A New Dimension in Marketing", Progressive Grocer, May 1987, pp. 133, 134 & 136.
"Tracking Shoppers with Personal Bar Codes," The New York Times, Jun. 18, 1989.
"Ukrop's Tests Data Base Marketing Program Electronic Couponing Tracks Buying Behavior of Valued Customers," Chain Store Age Executive, Sep. 1987, pp. 73-75.
Wilkies, "Catalina, Coupons Online in Tests," Advertising Age, Aug. 28, 1995, p. 15.
Wolverton, "Coolsavings settles e-coupon patent dispute," CNET News, Jul. 10, 2000, 2 pages. http://news.cnet.com/Coolsavings-settles-e-coupon-patent-dispute/2100-1017_3-242969.html?tag=mncol.
Wolverton, "Coolsavings settle patent suite," CNET News, Dec. 13, 2000, 2 pages. http://news.cnet.com/Coolsavings-settles-patent-suit/2100-1017_3-249876.html?tag=mncol.
e-Centives Internet Coupons "Why Coupon Security Controls Matter" 2007 http://www.e-centives.com/pdf/EC_WhyCouponSecurityMatters.pdf (1 page).
U.S. Appl. No. 12/603,481, filed Oct. 21, 2009, Final Office Action, Mar. 10, 2011.
U.S. Appl. No. 12/274,348, filed Nov. 19, 2008, Office Action, Mar. 3, 2011.
Australian Office Action received in Application No. 2008249235 dated Sep. 21, 2011 (2 pages).
Australian Current Claims in Application No. 2008249235 dated Sep. 2011 (7 pages).
Canadian Office Action received in Application No. 2,672,294 dated Dec. 5, 2011 (3 pages).
Current Claims of Canadian Application No. 2,672,294 dated Dec. 2011 (7 pages).
European Office Action received in Application No. 08170408.2 dated Dec. 8, 2011 (5 pages).
Current Claims of European Application No. 08170408.2 dated Dec. 2011 (5 pages).
Australian Office Action received in Application No. 2008249235 dated Jan. 4, 2012 (1 page).
Current Claims of Australian Application No. 2008249235 dated Jan. 2012 (6 pages).
U.S. Appl. No. 12/016,165, filed Jan. 17, 2008, Final Office Action, Nov. 28, 2011.
U.S. Appl. No. 12/274,348, filed Nov. 19, 2008, Notice of Allowance, Dec. 22, 2011.
Canadian Intellectual Property Office, "Search Report" in application No. 2,672,294, dated Aug. 28, 2015, 10 pages.
Canadian Claims in application No. 2,672,294, dated Aug. 28, 2015, 7 pages.
U.S. Appl. No. 11/372,243, filed Mar. 8, 2006, Office Action, Jun. 2, 2015.
Claims in Canadian Application No. 2,672,294, dated Mar. 2015, 7 pages.
Canadian Intellectual Property Office, "Search Report" in application No. 2,672,294, dated Mar. 31, 2015, 8 pages.
IP Australia, "Patent Examination Report No. 1", in application No. 2009246344, dated Oct. 7, 2013, 4 pages.
Current Claims in application No. 2009246344, dated Oct. 2013, 6 pages.
European Patent Office, European Search Report, in application No. 09747527.1, dated Dec. 12, 2012, 6 pages.
Current Claims in application No. 09747527.1, dated Dec. 2012, 7 pages.
U.S. Appl. No. 11/372,243, filed Mar. 8, 2006, Office Action, Jun. 19, 2013.
U.S. Appl. No. 12/603,485, filed Oct. 21, 2009, Final Office Action, Feb. 12, 2014.
U.S. Appl. No. 11/372,243, filed Mar. 8, 2006, Final Office Action, Mar. 26, 2014.
U.S. Appl. No. 12/016,165, filed Jan. 17, 2008, Final Office Action, Jan. 31, 2015.
Canadian Intellectual Property Office, "Search Report" in application No. 2,672,294, dated Apr. 18, 2016, 4 pages.
Current Claims in application No. 2,672,294, dated Feb. 2014, 7 pages.
Canadian Intellectual Property Office, "Examination Report" in application No. 2,672,294, dated Feb. 20, 2014, 3 pages.
Canadian Intellectual Property Office, "Office Action" in application No. 2,672,294, dated Sep. 6, 2013, 6 pages.
Current Claims in application No. 2,672,294, dated Sep. 2013, 7 pages.

(56) References Cited

OTHER PUBLICATIONS

U.S. Appl. No. 12/603,485, filed Oct. 21, 2009, Office Action, Sep. 25, 2013.
U.S. Appl. No. 11/372,243, filed Mar. 8, 2006, Office Action, Nov. 1, 2013.
U.S. Appl. No. 12/968,031, filed Dec. 14, 2010, Office Action, Oct. 2, 2013.
U.S. Appl. No. 12/0106,165, filed Jan. 17, 2008, Office Action, Oct. 25, 2016.
Microsoft Windows XP version 2002 screen shot showing controls disabled be admin (1 page).
Australian Patent Office, "Office Action" Application No. 2008206204, Applicant: Coupons.com, Dated Jun. 17, 2011, 4 pages.
Current Claims in Application No. 2008206204, Applicant: Coupons.com, 2 pages, dated Jun. 2011.

\* cited by examiner

Please paste the following script into any of your web pages or websites the comply with our program policies:

```
<script language="javascript" type="text/javascript">
var ci_cap_scriptid="17";
var ci_cap_bid= "1013710001";
var ci_cap_format= "728x90";
var ci_cap_channel= "Ravi_Trk1";
</script>
<script language="javascript" type="text/javascript"
src="http://brandcaster.coupons.com/core.aspx"></script>
```

710

Edit This Script | Proceed to Script Management >

FIG. 7

FIG. 8

DISTRIBUTING COUPON CONTENT AND TRANSACTIONAL ADVERTISEMENTS

BENEFIT CLAIM; RELATED APPLICATIONS

This application claims the benefit as a Continuation of U.S. application Ser. No. 12/465,634, filed May 13, 2009, entitled "System and Method for Distributing Coupon Content and Transactional Advertisements", which claims benefit of priority of U.S. Provisional Application No. 61/052, 996, filed May 13, 2008; the entire contents of each of which is hereby incorporated by reference as if fully set forth herein. The applicant(s) hereby rescind any disclaimer of claim scope in the parent applications or the prosecution history thereof and advise the USPTO that the claims in this application may be broader than any claim in the parent applications.

BACKGROUND

Different advertisement services currently exist for publishers of websites and content. Generally, these services enable publishers to enroll in a program where the service selects and displays advertisements on the publisher's web site. The advertisements are often selected to match the content of the publisher's website. Traditionally, the content of the advertisement may include text, images, or even video.

Coupons are items that can be used to procure something of value (e.g. discount) in a transaction (e.g. for the purchase of a product that is the subject of the coupon content). Typically, coupons are issued for use in retail stores as a form of marketing or promotion. In the past, coupons were distributed in print form through mail, magazines, and newspapers. Increasingly, coupons are distributed through the Internet. Coupons that are distributed over the Internet can resemble traditional coupons (i.e. those distributed through the mail or in newspapers), but such coupons are printed from a user's computer.

Numerous types of coupons exist. Some coupons are unstructured and other coupons are structured and formatted in compliance with industry or published standards for coupons. The typical components of structured coupons include an image and/or text reciting the value of the offer, the product(s) offered, terms and conditions, and a barcode that can be scanned and validated (e.g., such as by a retailer).

This barcode is typically standardized (e.g., one standardized barcode format is UPC Version A which has the following format:

5 MMMMM FFFVV c)

In this format, the first digit(s) are either the number five (5) or the number ninety-nine (99). This number identifies the barcode as a coupon to the point-of-sale (POS) machine/logic. The second set of digits is comprised of a five-digit manufacturer identification number. In most cases, this number must match the manufacturer identification number ("Manufacturer ID") of the item being discounted by the coupon. This is shown as MMMMM above. The next three (3) digits is a family code, summary code or super summary code. This number is determined by a manufacturer and is based on how the manufacturer is offering the coupon. The family code hierarchy of the coupon is predetermined by a manufacturer and used so that a coupon can only be redeemed for those items associated with the manufacturer ID and family code of the coupon. In the depicted format, the next two (2) digits are a value code. This is taken from a predetermined listing, published by GS1 (formerly the Uniform Code Council). The final digit is a check character that is calculated from the previous eleven (11) digits, shown as c above.

The bar codes on coupons provide information that enables the retailer to match the items the individual is purchasing with the offers in the coupons. For example, a UPC A type coupon, point-of-sale machine/logic identifies and reads the barcode on the coupon, and compares the information of the barcode with the stored information in the retailer's product file. Typically, the machine/logic checks the items purchased by the customer in order to identify an item with that same manufacturer ID number that is within the barcode symbol on the coupon. If product(s) with the same manufacturer ID exist in the purchase, the machine/logic checks to see if the family code of the coupon accommodates the product identifier of the items purchased. If there is a match, the value of the coupon is deducted from the customer's order. If there is no match, the machine/logic generates an error code.

DETAILED DESCRIPTION OF EMBODIMENTS

Embodiments described herein provide a system in which a publisher of a website may subscribe to a distribution site in order to receive transactional advertisements for their web site. In particular, one form of transactional advertisement is coupon content, which, under an embodiment, is delivered from a distribution site to a publisher website (or other web property) in a manner that enables a user of the web property (i.e. the consumer) to act on and use (e.g., print) the coupon content. The coupon content may be distributed to many publishers operating independently from the distribution site, in a manner that enables the distribution site to control the use of the coupon content by users of the online publishers. Still further, one or more embodiments provides that the distribution site distributes transactional advertisements (such as coupon content) to any number of online publishers with programmatically implemented restrictions and controls, so as to restrict and control the use of the transactional advertisement on the publisher's web property.

In the case of coupon content, embodiments provide that the user is able to perform a print action that yields a properly coded and formatted coupon. However, in order to inhibit coupon fraud or misuse, embodiments provide that the coupon content is made available to the publisher (e.g., on the publisher's web property) with programmatic control elements that originate from a distribution site in order to restrict and control the generation of print form coupons from the coupon content. According to one or more embodiments, the control elements restrict the user in the number of times that a print operation can be performed on the coupon content in order to generate a corresponding print form coupon. The control elements may also implement other restrictions that safeguard against the ability of the user to duplicate the coupon content or otherwise print unauthorized versions or quantities of the coupon.

As used herein, the term "transactional advertisement" means promotional or advertisement content that has the additional purpose of being used to facilitate a transaction. An example of a transactional advertisement is coupon content, which (i) includes content that advertises or promotes a product/service, and (ii) can be acted upon by the user (e.g., a print request) in order to generate a print form coupon. Another example of a transactional advertisement includes content that advertises, promotes and enables a transaction for the promoted product/service.

According to one or more embodiments, a system is provided for distributing transactional advertisements over a network. The system includes a storage medium and a plurality of modules that operate on a distribution site of the transactional advertisements. The storage medium stores data corresponding to a plurality of transactional advertisement items. The plurality of modules includes a publisher interface and a distribution module. The publisher interface module is made accessible to a plurality of publishers over the network. The publisher interface module also enables individual publishers to specify one or more web properties that are to include transactional advertisement items. The distribution module is configured to select from the storage medium a set of transactional advertisement items for each web property.

In another embodiment, transactional advertisement items are distributed over a network. At a distribution site of the transactional advertisement items, a script is generated to execute on a web property of a publisher site. The script may execute to trigger one or more components operating on or with the distribution site to deliver transactional advertisement items to the publisher site. Responsive to the script executing from a user terminal accessing the web property, one or more transactional advertisement items are selected for the web property. The one or more selected transactional advertisement items are communicated to the web property of the publisher (from the distribution site) in order to be rendered on the web property. The one or more selected transactional advertisement items are rendered with control elements provided from the distribution site to control use of the transactional advertisement items on the user terminal.

Still further, another embodiment provides for maintaining a collection of coupon content at a distribution site that is available for online publishers. A plurality of online publishers may subscribe to receiving coupon content from the distribution site. The coupon content may be received or used on a web property of the publisher. For a given web property of the publisher, one or more coupon content is selected from the collection. The distribution site programmatically transmits the coupon content to the publisher web property where it is displayed for the user (e.g., to print coupons).

One or more embodiments described herein provide that methods, techniques and actions performed by a computing device are performed programmatically, or as a computer-implemented method. Programmatically means through the use of code, or computerexecutable instructions. A programmatically performed step may or may not be automatic.

Any of the embodiments described herein may be implemented using modules. A module may include a program, a subroutine, a portion of a program, or a software component or a hardware component capable of performing one or more stated tasks or functions. As used herein, a module can exist on a hardware component independently of other modules, or a module can be a shared element or process of other modules, programs or machines.

Furthermore, any embodiments described herein may be implemented through the use of instructions that are executable by one or more processors. These instructions may be carried on a computer-readable medium. Machines or modules shown in figures provide herein include examples of processing resources and computer-readable mediums on which instructions for implementing embodiments of the invention can be carried and/or executed. Examples of computer-readable mediums include permanent memory storage devices, such as hard drives on personal computers or servers. Other examples of computer storage mediums include portable storage units, such as CD or DVD units, flash memory (such as carried on many cell phones and personal digital assistants (PDAs)), and magnetic memory. Computers, terminals, network enabled devices (e.g. mobile devices such as cell phones) are all examples of machines and devices that utilize processors, memory, and instructions stored on computer-readable mediums.

System Description

Figure 1:
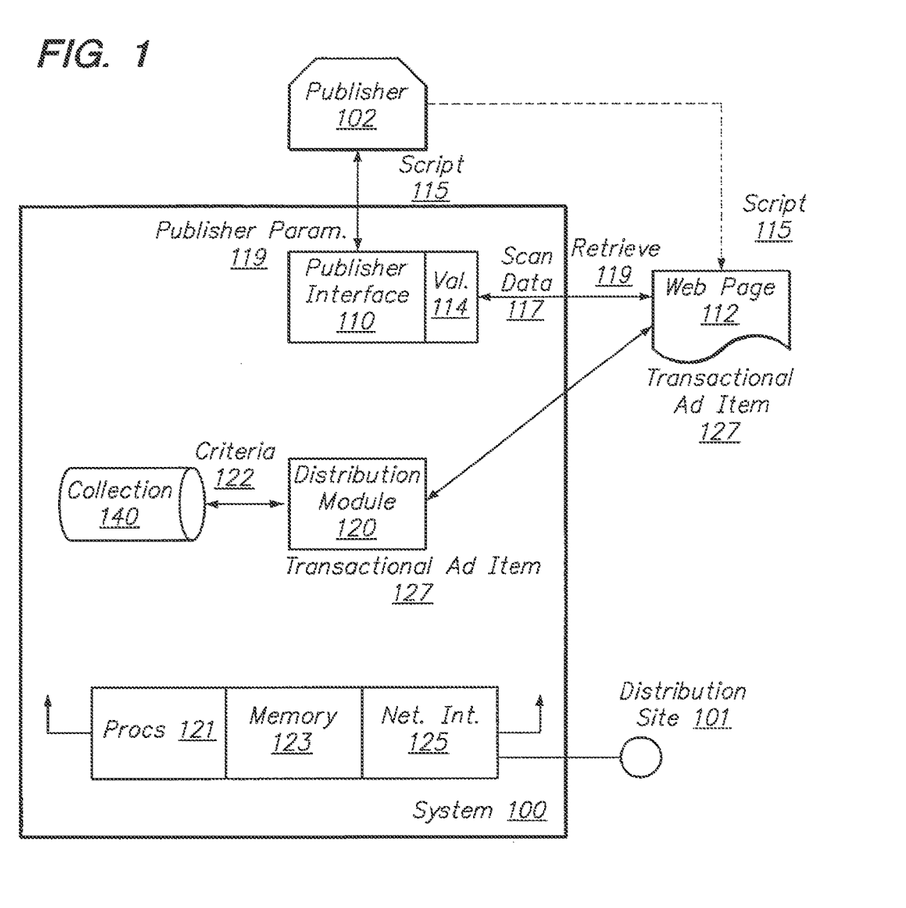
FIG. 1 illustrates a system for distributing coupon content and/or other transactional advertisements, according to an embodiment of the invention.

FIG. 1 illustrates a system for distributing coupon content and/or other transactional advertisements, according to an embodiment. In an embodiment, a system 100 includes one or more modules, including a publisher interface 110 and a distribution module 120. System 100 may be associated with a distribution site 101 having a corresponding domain or web address. The components of system 100 may be implemented using a combination of hardware that includes one or more processors 121, memory resources 123, and a network interface 125. For example, system 100 may be implemented on a server (or combination of servers) that operate to provide modules that correspond to publisher interface 110 and distribution module 120. System 100 may be operated on a network so that the publisher interface 110 is accessible over a network (such as the Internet) to publishers 102. Publishers 102 may include website operators, bloggers, or other content publishers that use websites or network addresses. System 100 is linked to the publishers 102 by the Internet (or other network), and the publishers 102 may operate independently of system 100. For example, each publisher 102 may operate on a domain that is different from that of system 100, under control of an operator that is separate and independent than an operator of system 100. The system 100 may maintain transactional advertisement items 127, for use as part of its distribution network. The transactional advertisement items 127 may be maintained with one or more database(s) or other data structure(s) that can be accessed and retrieved by one or more components of the system 100. As an alternative, the transactional advertisement items 127 may originate from a source outside of system 100, such as from a third party.

The operator of system 100 may receive fees from sponsors of advertisements and/or coupons based on parameters 119 that include one or more of (i) coupons/advertisements that are viewed (i.e. 'impressions'); (ii) coupons or transactional advertisements that are used (e.g. printed); and/or (iii) coupons that that are actually redeemed. To incentivize publishers, the operator of system 100 may implement fee distribution agreements, where publishers receive a portion of the overall fees that the operator of system 100 would otherwise collect. Thus, system 100 may enable publishers to monetize their web content through display of transactional advertisements, such as content that is redeemable as a coupon.

Figure 8:
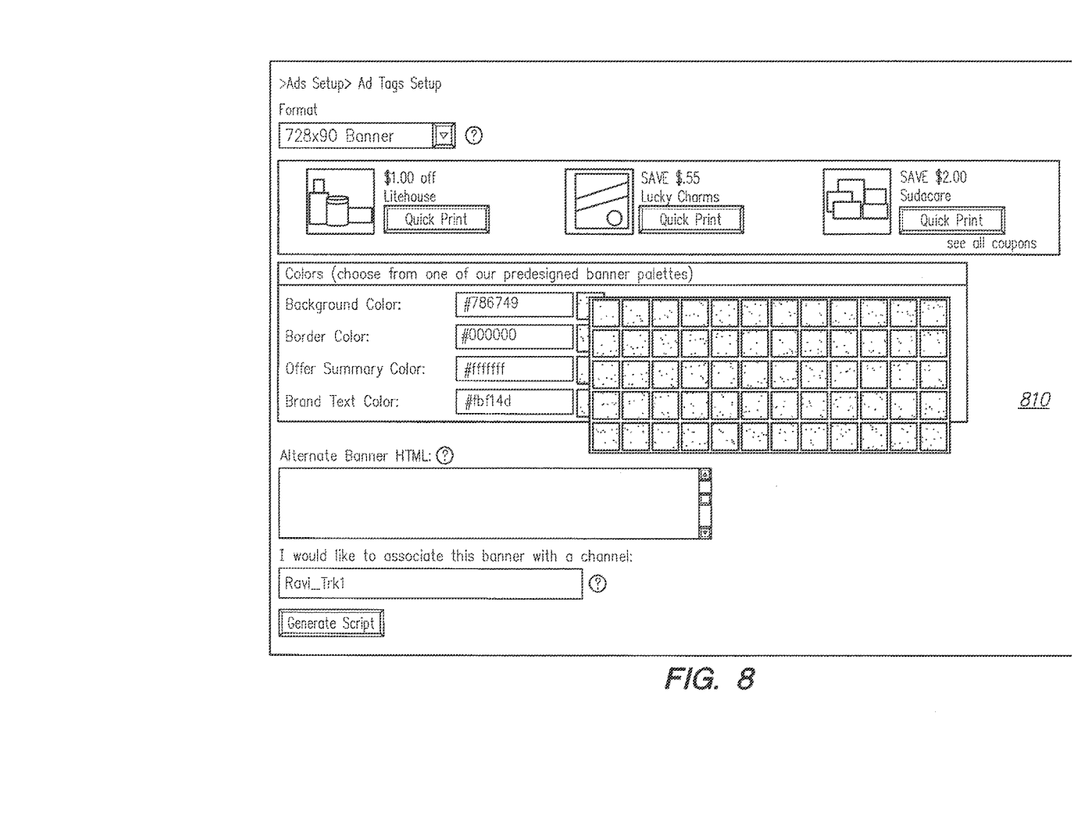
FIG. 8 illustrates an interface for a publisher who subscribes to a service such as provided with system 100 of FIG. 1, under an embodiment.

In an embodiment, the publisher interface 110 provides web-based interfaces for individual publishers 102 that wish to subscribe to receiving the transactional advertisements. In one embodiment, the publisher 102 interacts through a web page or other interface to (i) specify a network address or location of his content (e.g. website, URL, domain information); and (ii) create or configure content for the transactional advertisement. In one implementation, the publisher 102 may create or specify one or more of (i) background appearance; (ii) foreground appearance; and (iii) text. An embodiment of FIG. 8 illustrates an interface that the publisher may use to create or configure transactional advertisements.

In an embodiment, the publisher interface 110 includes a validation component 114 that accesses the publisher's web content to validate the content of the website. In one embodiment, the validation component 114 dispatches a crawler to retrieve 119 text and other scanned data 117 from the publisher's web property. A web property may correspond to a website, a resource (such as a page or file) provided at a website or location, or a network of websites and locations. Examples of web properties include web pages, blogs, or "networks" that are operated by a common entity across multiple domains.

The validation component 114 may use the scanned or retrieved data 117 as a mechanism for checking that the publisher website provides appropriate surrounding content for display of transactional advertisements. For example, the validation component may operate to reduce brand tarnishment that may result from a transactional advertisement being displayed with offensive or inappropriate content. The validation component 114 may check keywords and perform other safeguards that ensure the publisher's domain is appropriate for display of certain transactional advertisements.

Once the publisher 102 has enrolled, the publisher interface 110 may generate a script 115 or other set of code. In one implementation, the script 115 is provided as JAVASCRIPT. The publisher 102 may carry or manually incorporate the script 115 into his web property so as to be embedded in the publisher's web page 112. The script 115 may execute when there is a download instance by a user (e.g. individual who views the publisher's web content through a web browser). In one embodiment, the script 115 acts as a handler for server-initiated inclusion of other scripts onto the web page (via transactional advertisement items 127). In addition to acting as a handler, the script 115 may determine an identification of the terminal of the user, and/or make a determination (either independently or through interactions with the server) as to whether the particular terminal of the download instance of the web page 112

The distribution module 120 interacts with the web page 112 in order to select and provide transactional advertisement items 127. In particular, one or more embodiments provide that the distribution module 120 retrieves or identifies key words and/or other information about the web page 112 in order to perform a relevance algorithm by which it can generate criteria for the selection of transactional advertisement items 127 for transmission to the web page 112 and the display order of such selected transactional advertisement items. In one embodiment, the script 115 handles communications or otherwise facilitates identification of key words from the web property for the distribution module 120. The distribution module 120 bases the selection criteria 122 on parameters that include one of more of the following (i) the context of the web page 112 (e.g. key words), (ii) identification or determination of popular transactional content items, as measured by one or more metrics (e.g. for coupons, most profitable, most downloaded, and/or most redeemed), and/or (iii) historical information, including past history of the user or terminal that downloads the web page 112 (e.g. what coupons the user has previously printed or redeemed). Other parameters may also be used, such as identification of demographics from information known about the site of the web page 112. The publisher may also specify coupon content (specifically, by type or class etc.) to exclude from being included on the web page 112. Once the criteria 122 is determined, the distribution module 120 may select transactional advertisement data items 127 from the collection 140, and delivers transactional advertisement items 127 to the web page 112 for the user. The transactional advertisement items 127 are delivered with elements such as described with FIG. 2. In an embodiment, the elements include control elements for restricting use (e.g. precluding unauthorized use or overuse) of the transactional data item. In this way, some embodiments provide that the distribution site 101 is able to serve transactional advertisement items similar to serving conventional online banner advertisement, for purpose of enabling creation of print-form coupons that (i) comply with industry standards, but (ii) are under control set forth from the distribution site 101. In particular, the use of scripts or other programmatic triggers that initiate delivery and handling of transactional advertisement items enables such data items to be served onto the publisher's web property with control elements that regulate or control how the data items are used.

According to one or more embodiments, transactional advertisement items correspond to coupon content which can be printed by the user as a coupon and redeemed or used at a point-of sale. Coupon content may be distributed using elements such as described with FIG. 2. A system such as described with FIG. 1 may distribute coupon content (or other transactional advertisement items) such that print-form coupons can be printed by individual users performing print operations. According to some embodiments, the print form coupons may comply with formatting standards, and represent issued coupon offers from a manufacturer (or retailer). As described with some embodiments, such coupons may be created in the online medium under many of the restrictions as conventional offline coupons, even though the online distribution site of the coupon content is separate from the web property at which the coupon content is presented. Specifically, coupon content may be printed into coupons that include product images and information, bar codes, and water marks (or other security features) that authenticate the coupon. As provided by embodiments described herein, an advertiser can make a coupon offer accessible to the public over an online medium, while maintaining control of the print form coupons that can be created or printed from the published coupon content. Such controls manage overuse and fraud. In an online environment, overuse can occur if individual users generate too many coupons (e.g., exceed the issuer's generation limits) from one coupon data item.

Figure 2:
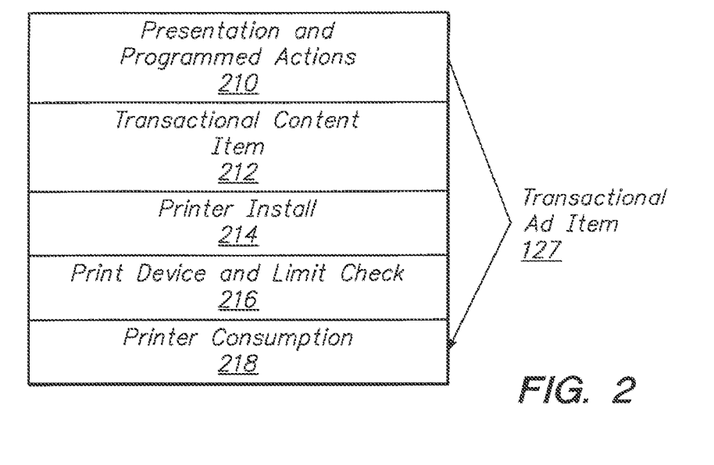
FIG. 2 illustrates components of a transactional advertisement item, such as described with FIG. 1, according to one or more embodiments.

FIG. 2 illustrates components of a transactional advertisement data item, such as described with FIG. 1, according to one or more embodiments. In one embodiment, the elements of the transactional advertisement items includes (i) elements 210 for enabling presentation and programmatic actions, (ii) content elements 212 corresponding to the selected transactional data items 127, (iii) a programmatic element 214 for enabling install of a printer control component (as necessary), a (iv) a printer check element 216, and (v) print consumption enabler 218.

The element 210 may include background art or layout, size designations, and instructions for enabling specific layout considerations or designs. The content elements 212 may correspond to, for example, selected coupon content or advertisement. In one embodiment, the programmatic element 214 corresponds to a program (or trigger to locate and initiate install of a program) that is installed on the terminal as a plug-in or other installed application, to both allow and to control or place restrictions on the ability of the user to print. In particular, as described below, the programmatic element 214 may execute to restrict the number of instances that a user can perform print operations. In order to implement such control, one embodiment provides that the programmatic element 214 includes a print 'driver' that is installed on user terminals, and which is triggered by the user performing the print operation on coupon content. The programmatic element 214 may (i) disable the ability of the user to select a printer other than a default printer, (ii) preclude the user from performing a print operation that would cause the transactional data item to print to an image or otherwise be able to be reproduced (with or without water marks).

In some implementations, the programmatic element 214 is not always installed. For example, if the user of the web page 112 (FIG. 1) already has the install that is triggered or provided by the programmatic element 214, the programmatic element 214 may not be used on that download. The check element 216 may monitor the printing activity (once the program specified by element 214 is installed).

The check element 216 may monitor the number of instances that the particular coupon is printed, or whether the printer that performs the print operation is approved. For example, one or more embodiments provide that the fax machines, or PDF distiller printers are not enabled to print coupons from the transactional advertisement items because those types of printers facilitate unauthorized duplication.

The print consumption element 218 triggers the print action so as to enable the print to occur without navigating the user away from the web page 112. In particular, the print consumption element 218 enables in-place printing, so that the user's viewing of the web page 112 is undisturbed after selecting to consume or otherwise print a coupon (corresponding to displayed coupon content provided on the web page 112). In one embodiment, the print consumption element 218 may operate on the user terminal to bypass the user's print wizard and make a direct print to the user's default printer. A print wizard corresponds to an interface, typically made present in response to a user's print command, that enables the user to select a printer (e.g. which local or network printer), as well as numerous settings for the printer (e.g. print quality, color versus black and white, paper tray or size, collate sequence of pages). By bypassing the print wizard, the user's attention is not distracted from the web page.

As an example, the user may view web content on a publisher site, then see transactional advertisement in the form of coupon content. The user may 'click' the coupon content. Rather than the click action opening a new web page, one or more embodiments provide that (assuming the programmatic element 214 is operating on the user terminal) a print form coupon corresponding to the displayed coupon content is printed to the user's default printer. In such an implementation, no web page is opened for the coupon content when the user 'clicks' the transactional advertisement. Thus, the user's view of the content on the web property of the publisher is relatively undisturbed.

Methodology

Systems such as described with embodiments of FIG. 1 and elsewhere may be used to implement various functions and features for distributing coupons and other types of transactional advertisements. In describing embodiments of FIG. 3-5, reference may be made to elements of FIG. 1 and FIG. 2 for purpose of illustrating suitable components or elements for performing a step or sub-step being described. Reference may be made to coupons and coupon content as a specific form of transactional content. However, as mentioned elsewhere, other forms of transactional advertisement items also may be implemented with embodiments described.

Figures 3, 4:
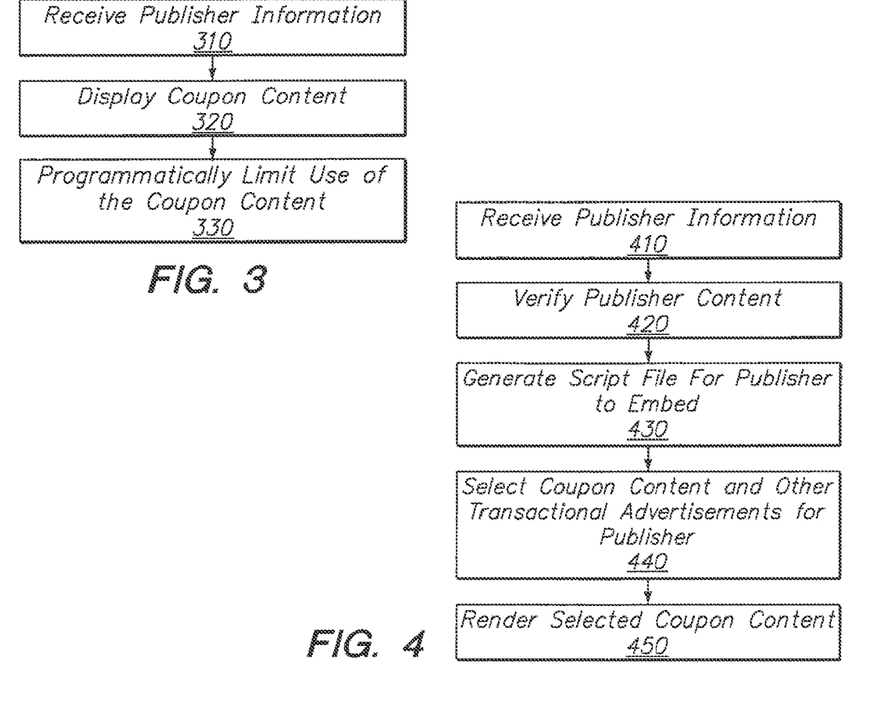
FIG. 3 illustrates a method for distributing coupon content to enable printable and redeemable coupons for users, according to an embodiment.
FIG. 4 illustrates a more detailed process for enabling distribution of coupon content and other transactional advertisement content, according to an embodiment of the invention.

FIG. 3 illustrates a method for distributing coupon content to enable printable and redeemable coupons for users, according to an embodiment. In a step 310, system 100 receives publisher information from publishers who wish to include coupons as a type of advertisement content on their website. For example, publishers may be incentivized to share in revenue generation, such as described with an embodiment of FIG. 1.

In step 320, coupon content is selected and displayed on the publisher's website or other web property. A relevance algorithm may be used, for example, as well as other criteria (e.g. such as those pertaining to revenue generation and history) to select the coupon content. The coupon content may be provided as an element within the data items (e.g. see transactional advertisement items 127) that are delivered to the publisher's web page. Other components may be provided in the data item to control printing of the coupon content into coupons.

Accordingly, step 330 provides that the coupon content are packaged or included with programmatic controls that control or otherwise regulate the manner in which the coupon content can be used. As described with an embodiment of FIG. 1 or FIG. 2, one manner of control includes controlling (i) the number of instances that coupon content is printed into coupons, and (ii) the type of printers that may 'print' coupon content. Among other benefits, such control enables the coupons to be restricted based on sponsor or coupon supplier restrictions. Examples of such restrictions include the number of identical coupons a user can redeem, authentication regarding the coupon being redeemed (e.g., not an unauthorized copy), and integrity of the contents of the coupon (e.g., protect against unauthorized redemption value of the coupon). Thus, for example, the user or the user's terminal may be able to perform a print operation on the coupon content (e.g., to create print form coupons redeemable at stores) a limit of once or twice. To protect the integrity of the coupon offer, the programmatic controls may limit what printers the user may use. Specifically, the programmatic controls may preclude the user from using a printer of an excluded class. In one embodiment, printers of an excluded class include scanners, facsimile machines, and certain digital print drivers (e.g., PDF printers and post script printers), which can otherwise facilitate the creation of fraudulent digital copies.

As an addition or alternative, an embodiment provides that some print control may be implemented on a campaign wide level. For example, some coupon content campaigns may limit the total number of print operations that can be performed on a given coupon content. Thus, for example, in some cases, a given coupon content may not be printable if a limit is reached as to how many times the coupon content has been printed by all users.

FIG. 4 illustrates a more detailed process for enabling distribution of coupon content and other transactional advertisement content, according to one or more embodiments. In step 410, publisher information may be received (e.g., see publisher interface 110 of FIG. 1). The information may be received through the publisher's interaction with an interface such as described with FIG. 8.

Step 420 provides that the publisher content is verified as being appropriate for display of coupons/transactional advertisement (e.g., see validation component 114 of FIG. 1). Step 430 provides that a script (or other set of code) is generated for the publisher to embed in his or her webpage or web properties. For example, as described with an embodiment of FIG. 1, the publisher interface 110 may generate the script 115 which the publisher can incorporate into his web property. In an embodiment, the script is operable (e.g., as a trigger) to retrieve coupon content from the site 101. An example of a script is provided with FIG. 7.

Steps 440 and 450 are performed responsively at an instance when a given user of a website downloads the webpage (or web property) on which coupon/transactional advertisement content is to be provided. Step 440 provides that coupon content or other transactional content items are selected based on factors such as relevance, revenue generation, and/or history of the user of the web page. Relevance may be based on information that is determined from or about the web property or directly from input provided by the web property publisher. For example, text displayed on the web property (e.g., web page) may be scanned and analyzed for keywords to determine relevance. Metadata associated with the web property may also be used. Still further, the advertiser (or issuer of the coupon) may specify terms (e.g., key words) or criteria for determining relevance for where that advertiser's coupon content is published. And still further, the web property publisher may specify certain coupon content criteria, such as not coupon content from a particular advertiser. Revenue generation factors may, for example, specify what coupon offers are most lucrative for the distribution site or the publisher. The history parameter may include parameters that indicate what coupons the particular user has previously viewed.

As an addition or alternative, multiple coupon content items may be selected for rendering of a web property of a given publisher. The coupon content can be selected and/or prioritized (e.g. top-down sort, with top position being prioritized) based on factors that also include: (i) selecting or sorting coupon content items based on how relevant each coupon content is to the content of the publisher's web property or criteria (e.g. more relevant coupon content being provided higher priority or sort); (ii) the value of the coupon content to the distributor or publisher (e.g. coupon issuer may provide added reward for some coupon offer's use).

Still further, some embodiments provide that coupon content is selected and/or prioritized for display in list format for the user, based on a determination of relevance or interest to the user (i.e. viewer of the web page). Such determinations may include determining information about the individual users who render the coupon content, then using that information to (i) select coupon content, and/or (ii) sort or prioritize the coupon content. In one embodiment, the user's terminal is identified, and referenced to coupon offers that the user previously printed or used. Coupons directed to a product, product type, or other classification that were previously of interest to the user may be prioritized when coupon content is selected or prioritized for the user. Conversely, if the user has printed some coupon content (so to have reached print limit), the coupon content may not be selected (or provided a low priority when listed)/Still further, an embodiment provides for determining geographic information about the user from, for example, the user's IP address (via a geo-IP service). Upon determination of the individual user's geographic region, coupon content may be selected or sorted based on geographic specific parameters. For example, coupon offers that are for retail centers outside of the user's immediate geographic region are not selected for that user, or alternatively provided a lower on the coupon content list.

Step 450 provides that the coupon or other transactional advertisement content is generated and rendered onto the web property of the publisher. For example, the coupon content may be displayed adjacent to text or other content, similar to a conventional banner ad. But as coupon content, the data item may be acted on by the user in order to generate a printed coupon. The distribution site (see FIG. 1) which may be remote to the web property may incorporate programmatic elements that control the print operations that can be performed on the web property, so as to manage overuse or fraud, among other reasons.

Figure 5:
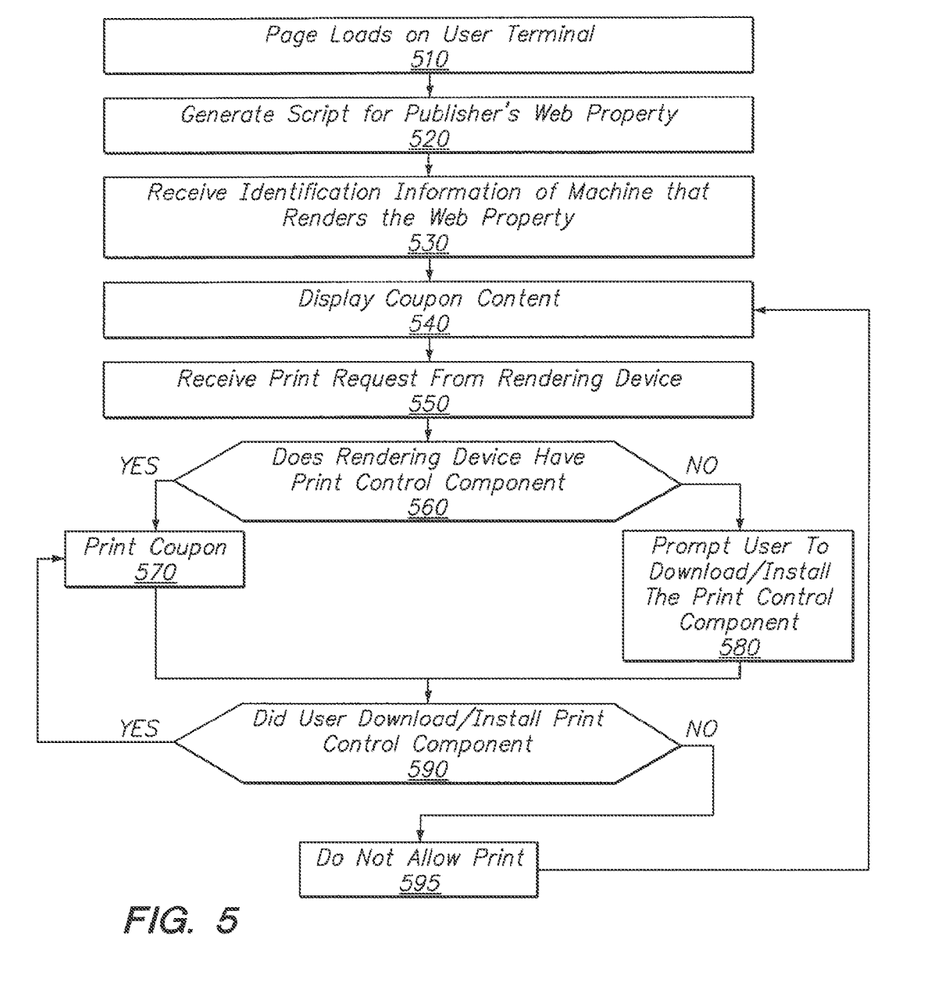
FIG. 5 illustrates a method for enabling a user of a publisher web page to use provided coupon content, according to an embodiment.

FIG. 5 illustrates a method for enabling a user of a publisher web property to use a coupon offer published on the web property, according to an embodiment. In a step 510, a user may access or interact with the webpage 112 (or other web property) of the publisher that subscribes to the advertisement network described with a system such as described with FIG. 1. In one embodiment, the download (or other user activity) on the webpage 115 causes the browser of the user's terminal to run the script 115, which performs functions that include determining the terminal's identification and/or determining whether the terminal has installed or otherwise includes a print control component. Terminal identification may be performed in many ways, including by cookies downloaded on the user's computer. U.S. patent application Ser. No. 12/274,348, which is incorporated by reference herein, discloses techniques by which terminals may be identified for purposes that include the ability to perform print operations on coupon content. In one embodiment, the script 115 serves as a handler that communicates with the server elements of system 100 for purposes that include incorporating additional scripts or functionality into the page under download. This additional functionality may be in the form of enabling system 100 to download additional one or more additional scripts that enable functionality such as described in steps below, or with one or more other embodiments.

Accordingly, an embodiment provides that in step 520, one or more additional scripts are generated for inclusion onto the web page. According to one embodiment, the generated scripts may enable the functionality and features such as described with an embodiment of FIG. 2, scripts for providing (i) element 212 for creating presentation and layout, (ii) print installation element 214, (iii) print check 216 for device or limit, (iv) enablement of in position print consumption (see element 218).

In step 530, system 100 receives from data generated by one of the scripts that correspond to (e.g. script 115 or subsequent script) the machine identification of the terminal that is viewing the web page. The machine identification may be generated from various identifiers on the user's machine, including the user's hard drive identifier and MAC address. U.S. patent application Ser. No. 12/274,348, which is incorporated by reference herein, discloses techniques by which such machine identification may be programmatically determined. Thus, one of the scripts may execute on the terminal to procure this information.

Step 540 provides that coupon content is displayed on the web page 112 as a form of transactional advertisement. The display of the coupon content may be performed independent of identifying the terminal. For example, a coupon content, similar to a banner ad, may both promote a particular product to the user and enable the user to receive a coupon (or offer) from the displayed coupon content. Accordingly, in response to the user requesting to print the coupon (step 550) content, a determination may be made in step 560 as to whether the user's device has a print control component installed. As mentioned above, the print control component may control (and thus provide safeguards preventing) (i) the user from making too many prints from the coupon content, or (ii) 'printing' the coupon content to a printer that enables image manipulation (such as a fax machine, or certain digital printers, such as PDF printers, Post Script printers and Document Writer printers i.e., "excluded class of printers"). If the determination is that the terminal has the control component, step 570 enables consumption of the coupon content (or alternatively, other transactional content). In the case of coupon content, consumption may correlate to generation of a hardcopy (i.e. print-form) of the coupon from the coupon content. In one embodiment, the hardcopy is generated without affecting the user's view of the publishers' webpage. For example, the print wizard on the user's terminal may be bypassed by the control component, and the print function may be performed as a background process, so that the browser maintains foremost view of the webpage that the user is using.

If the determination is that the terminal does not have the control component, step 580 provides that the user is provided a prompt or message to download and install the control component. In step 590, a determination is made as to whether the user performed the download. If the user performed the download, the method proceeds to step 570, where the coupon is consumed (e.g. printed). If the user did not perform the download, step 595 provides that the coupon content is displayed, but not usable. In the context provided, this may correspond to the coupon content being non-printable (and thus not usable as a coupon).

Figure 6:
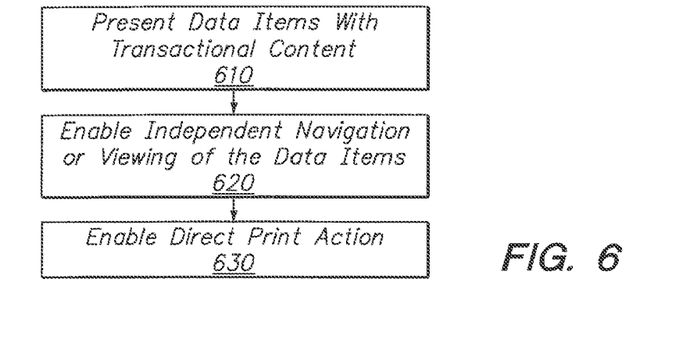
FIG. 6 illustrates a method for enabling display of coupon content or other transactional advertisement content, according to an embodiment.

FIG. 6 illustrates a method for enabling display of coupon content (or content corresponding to other transactional advertisement content), according to an embodiment. In particular, one or more embodiments enable online publishers to present coupon content in their own web content as a form of advertisement or marketing (e.g. similar to banner ads). The coupon content is presented in a manner that enables viewers of the web property to 'consume a transaction' of the coupon content without disturbing their view of the publisher's content. In one embodiment, the users on the publisher's web property are able to view the coupon content and perform a print operation to print coupons, while continuously maintaining the web property of the publisher under view and in position. According to some implementations, the user's election to perform the print operation does not, for example, open a print wizard on the user's terminal, or cause the user's browser to navigate to a new web page.

According to an embodiment, step 610 provides for presenting coupon content as data items that are included or made a part of the presentation of the publisher's web property. For example, coupon content may be displayed similar to banner ads on a perimeter portion of a web page. Step 620 provides for enabling independent navigation or viewing of the coupon content, separate from the remainder of the web page under view. In one implementation, the user is able to (i) view closeup, and (ii) scroll in a coupon window from one coupon content item to another. These actions may be performed in-position, meaning the webpage under view remains prominent, and the browser is not directed to navigate to (or open) a new page to show the coupon content. Thus, for example, the user may view coupon content (displaying one or more offers) on the perimeter or other subsection of a page, without navigating away or having the content on the page obstructed.

Step 630 provides for enabling direct consumption of the coupon content. As described with an embodiment of FIG. 5, this may correspond to enabling the user to perform a direct print operation. In such an operation, the print control component (or other functionality) provided with the coupon content executes to identify the default printer and to print to the default printer while bypassing any prompts or wizards that the printer interface may typically provide.

As described with other embodiments, step 630 may be performed with programmatic controls that preclude over-printing or printing to a file or location that enables unauthorized duplication.

Script

Figure 7:
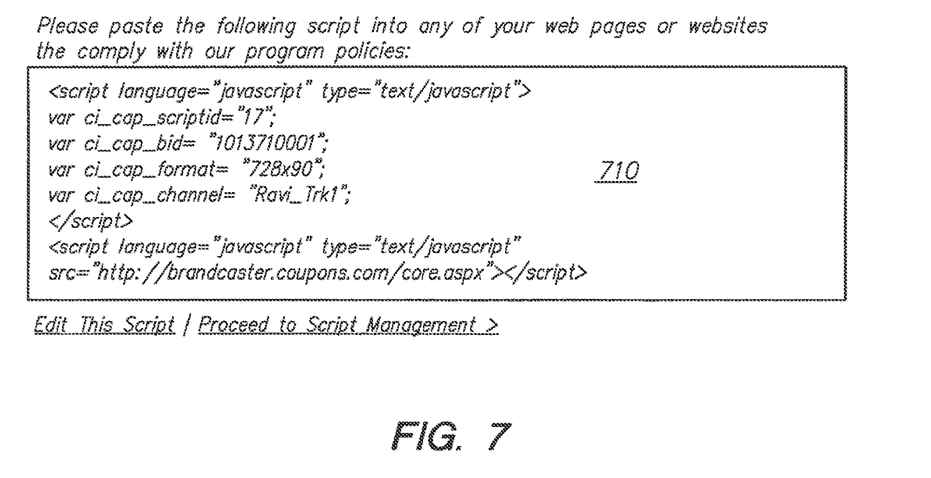
FIG. 7 illustrates a handler script for use with one or more embodiments described herein.

FIG. 7 illustrates a handler script for use with one or more embodiments described herein. A handler script 710 may correspond to, for example, script 115 which initiates a sequence of communication events between a publisher's web page 112 (see FIG. 1) and the system 100 (FIG. 1). The communication events may bring into or incorporate additional scripts of functions that the browser may perform in rendering the coupon content. As described above, such additional functionality may design layout, detect print control components, perform printer checks for device and limit use and perform other functions. The script may include line items that identify the publisher's domain ("script ID" and "bid") so that the publisher cannot incorporate the handler script onto another web page. Such control precludes the script from being incorporated into a non-approved web page (i.e. validation component 114 of FIG. 1 has not approved the content). The handler script 710 may also include format code based on standardized parameters relating to, for example, size of placement, and tracking information to enable the publisher to track the content. Additionally, the handler script 710 may include a call to a page or other network resource that has additional scripts or functionality, such as those described with one or more other embodiments.

FIG. 8 illustrates an interface for a publisher who subscribes to a service such as provided with system 100 of FIG. 1, under an embodiment. a publisher may interact with the interface 810 to specify the format for the generated coupon/transactional content, including background coloring and display feedback (showing the operator what his format selections appear like). Among other features, the publisher may select background, border, summary color, and text color using a color palette or other color selection tool. The publisher may also specify alternative advertisements or services should selected coupon or transactional content not be available at a given instance (e.g., such as when a user scrolls through all of the coupons that are selected for his page). The publisher may also select a tracking identifier. Other implementations may enable the publisher to designate classifications for the type of coupon or transactional content that he wishes to include on the web page.

Alternatives

While numerous embodiments described recite coupon content as a type of transactional advertisement content, one or more embodiments contemplate other kinds of such content. For example, transactional advertisement content may correspond to an advertisement banner that enables the user to purchase the displayed product on site, without further web navigation to other sites.

Although illustrative embodiments of the invention have been described in detail herein with reference to the accompanying drawings, it is to be understood that the invention is not limited to those precise embodiments. As such, many modifications and variations will be apparent to practitioners skilled in this area. Accordingly, it is intended that the scope of the invention be defined by the following claims and their equivalents. Furthermore, it is contemplated that a particular feature described either individually or as part of an embodiment can be combined with other individually described features, or parts of other embodiments, even if the other features and embodiments make no mentioned of the particular feature. Thus, the absence of describing combinations should not preclude the inventor from claiming rights to such combinations.

What is claimed is:

1. A system for distributing a transactional advertisement to a user terminal over a network, the system comprising:
   one or more storage media storing a plurality of transactional advertisements, wherein each transactional advertisement of the plurality of transactional advertisements comprises coupon content that is redeemable for value when printed in hard-copy form;
   a publisher interface module operable to generate a script to embed in a web page that is to include transactional advertisements, wherein said publisher interface module is operable to generate the script in response to a request specifying an identifier of the web page from a publisher of the web page;
   wherein the publisher interface module comprises a validation component that is operable to dispatch a web crawler to retrieve scanned data from the web page, and the validation component is operable to use the scanned data to validate that the web page is appropriate for display of one or more of the plurality of transactional advertisements;
   a distribution module operatively coupled to the user terminal over the network;
   said distribution module operable to deliver a transactional advertisement data item corresponding to a selected transactional advertisement of the plurality of transactional advertisements to the user terminal over the network in a manner that causes the coupon content of the selected transactional advertisement to be displayed to a user at the user terminal as part of the web page, wherein the coupon content displayed to the user as part of the web page is redeemable for value when printed as displayed in hard-copy form;
   said distribution model operable to select the selected transactional advertisement based on one or more of: keywords from the web page, determination of popular transactional advertisements as measured by one or more metrics, historical information regarding past downloads of the web page by the user or user terminal, and identification of demographics information about the web page;
   said distribution module operable to deliver a print control component to the user terminal over the network for restricting a manner in which the coupon content displayed as part of the web page may be printed at the user terminal.

2. The system of claim 1, wherein said distribution module is operable to deliver the print control component to the user terminal in response to receiving a request from the user terminal over the network caused by a request by the user to print the coupon content displayed as part of the web page.

3. The system of claim 1, wherein the print control component delivered to the user terminal restricts printing of the coupon content displayed as part of the web page to a particular number of instances of the coupon content.

4. The system of claim 1, wherein the print control component delivered to the user terminal restricts printing of the coupon content displayed as part of the web page to a default printer connected to the user terminal.

5. The system of claim 1, wherein the print control component delivered to the user terminal restricts printing of the coupon content displayed as part of the web page to a particular class of printers.

6. A method for distributing a transactional advertisement to a user terminal over a network, the method comprising:
   storing a plurality of transactional advertisements on one or more storage media, wherein each transactional advertisement of the plurality of transactional advertisements comprises coupon content that is redeemable for value when printed in hard-copy form;
   generating a script to embed in a web page that is to include transactional advertisements in response to a request specifying an identifier of the web page from a publisher of the web page;
   dispatching a web crawler to retrieve scanned data from the web page, and using the scanned data to validate that the web page is appropriate for display of one or more of the plurality of transactional advertisements;
   delivering a transactional advertisement data item corresponding to a selected transactional advertisement of the plurality of transactional advertisements to a user terminal over a network in a manner that causes the coupon content of the selected transactional advertisement to be displayed to a user at the user terminal as part of the web page, wherein the coupon content displayed to the user as part of the web page is redeemable for value when printed as displayed in hard-copy form;
   selecting the selected transactional advertisement based on one or more of: keywords from the web page, determination of popular transactional advertisements as measured by one or more metrics, historical information regarding past downloads of the web page by the user or user terminal, and identification of demographics information about the web page; and
   delivering a print control component to the user terminal over the network for restricting a manner in which the coupon content displayed as part of the web page may be printed at the user terminal;
   wherein the method is performed by one or more computing devices.

7. The method of claim 6, further comprising delivering the print control component to the user terminal in response to receiving a request from the user terminal over the network caused by a request by the user to print the coupon content displayed as part of the web page.

8. The method of claim 6, wherein the print control component delivered to the user terminal restricts printing of the coupon content displayed as part of the web page to a particular number of instances of the coupon content.

9. The method of claim 6, wherein the print control component delivered to the user terminal restricts printing of the coupon content displayed as part of the web page to a default printer connected to the user terminal.

10. The method of claim 6, wherein the print control component delivered to the user terminal restricts printing of the coupon content displayed as part of the web page to a particular class of printers.

11. A computer-readable storage medium storing processor-executable instructions for distributing a transactional advertisement to a user terminal over a network, which instructions, when executed by one or more processors, cause:

storing a plurality of transactional advertisements on one or more storage media, wherein each transactional advertisement of the plurality of transactional advertisements comprises coupon content that is redeemable for value when printed in hard-copy form;

generating a script to embed in a web page that is to include transactional advertisements in response to a request specifying an identifier of the web page from a publisher of the web page;

dispatching a web crawler to retrieve scanned data from the web page, and using the scanned data to validate that the web page is appropriate for display of one or more of the plurality of transactional advertisements;

delivering a transactional advertisement data item corresponding to a selected transactional advertisement of the plurality of transactional advertisements to a user terminal over a network in a manner that causes the coupon content of the selected transactional advertisement to be displayed to a user at the user terminal as part of the web page, wherein the coupon content displayed to the user as part of the web page is redeemable for value when printed as displayed in hard-copy form;

selecting the selected transactional advertisement based on one or more of: keywords from the web page, determination of popular transactional advertisements as measured by one or more metrics, historical information regarding past downloads of the web page by the user or user terminal, and identification of demographics information about the web page; and delivering a print control component to the user terminal over the network for restricting a manner in which the coupon content displayed as part of the web page may be printed at the user terminal.

12. The medium of claim 11, further comprising instructions which when executed cause delivering the print control component to the user terminal in response to receiving a request from the user terminal over the network caused by a request by the user to print the coupon content displayed as part of the web page.

13. The medium of claim 11, wherein the print control component delivered to the user terminal restricts printing of the coupon content displayed as part of the web page to a particular number of instances of the coupon content.

14. The medium of claim 11, wherein the print control component delivered to the user terminal restricts printing of the coupon content displayed as part of the web page to a default printer connected to the user terminal.

15. The medium of claim 11, wherein the print control component delivered to the user terminal restricts printing of the coupon content displayed as part of the web page to a particular class of printers.

* * * * *